Oct. 10, 1950     M. MENNESSON     2,525,364
MACHINE TOOL

Filed March 1, 1945     2 Sheets-Sheet 1

INVENTOR
MARCEL MENNESSON
BY Henry J. Lucke
ATTORNEY

Oct. 10, 1950     M. MENNESSON     2,525,364
MACHINE TOOL

Filed March 1, 1945     2 Sheets-Sheet 2

Fig. 3

INVENTOR
MARCEL MENNESSON
BY Henry J. Lucke
ATTORNEY

Patented Oct. 10, 1950

2,525,364

UNITED STATES PATENT OFFICE 2,525,364

MACHINE TOOL

Marcel Mennesson, Neuilly-sur-Seine, France, assignor to Societe d'Appareils de Controle et d'Equipment de Moteurs (S. A. C. E. M.), (new), a French society Application March 1, 1945, Serial No. 580,414
In France August 14, 1943

Section 1, Public Law 690, August 8, 1946
Patent expires August 14, 1963

1 Claim. (Cl. 51—166)

The present invention relates to machine tools, this expression being taken in its most general meaning.

Up to the present time, in order to machine a piece on a machine tool to a dimension fixed in advance, use is made of several movements permitting to displace the piece with respect to the tool or the tool with respect to the piece and, in in a general manner, permitting all kinds of combinations in the respective displacements of the tool or of the piece, the values of these displacements being recorded by measurement apparatus of a suitable type. But these measurement apparatus, however accurate they may be, only determined, as a matter of fact, the displacements of the piece holding carriage or of the tool holding carriage with respect to a fixed point of the machine at the time when the measurement is being effected.

When the work is to be made with a high precision, say of the order of one thousandth of a millimeter, it is found that the variations of dimensions of the piece as it is being machined do not correspond exactly to the displacement of the tool holder with respect to the piece holder, or again that several pieces machined in the same manner have, after machining, different dimensions, although the respective positions of the tool holder and the piece-holder have remained unchanged.

These variations of dimensions result from deformations which take place in the mass of the frames, carriages, tool holders, or piece holders, and which, consequently, cannot be recorded by the measurement apparatus, which only indicate the displacements of each unit with respect to another unit.

These deformations are caused by bendings, twistings, modifications of bearing relation, etc., which may be of very variable origin and which are due, among other causes, to a force consisting of the action, or the reaction as the case may be, of the piece on the tool by means of which it is being machined.

Consequently, if pieces which are substantially identical, although very slightly different in dimension, are machined on the same machine the adjustment of which is left unchanged, the force in question, and therefore the deformations it causes, vary in accordance with the dimensions of the piece that is being machined, whereby the final dimensions of the piece depend partly upon the initial dimensions of said piece.

The chief object of the present invention is to provide an improved machine-tool which is capable of ensuring more accurate dimensions of machining than it had been possible up to now.

With this object in view, according to an essential feature of the present invention, the machine-tool comprises, on the one hand, means for imparting to at least some of the machine elements which maintain the relative position of the piece to be machined with respect to the tool, a stress producing an elastic deformation of these elements, and, on the other hand, means permitting of making use of this deformation for adjusting said relative position.

Other features of the present invention will result from the following detailed description of some specific embodiments thereof.

Preferred embodiments of the present invention will be hereinafter described, with reference to the accompanying drawings, given merely by way of example, and in which:

Fig. 3 is a similar view, illustrating a third embodiment of the invention.

In the following description, I will explain how I make a machine-tool, according to the present invention.

The general organization of this machine-tool is established in any suitable manner, by providing it, for instance, with the usual means for displacing the carriages, piece-holders, or tool-holders, and the like.

According to the present invention, the machine is further provided with means for imparting to at least some parts of the machine elements which maintain the relative position of the piece to be machined with respect to the tool, a stress, which will be hereinafter called "imposed stress," capable of producing an elastic deformation of these elements.

These means advantageously include an elastic device, such as a spring, the tension of which is adjustable, for instance by means of a screw, in such manner as to obtain a high sensitiveness of the means for producing said "imposed stress."

Advantageously, the means in question are arranged in such manner that the "imposed stress" can be given an important value with respect to that of the supplementary stress, which will be hereinafter referred to as "machining stress," resulting from the action, or reaction, of the piece on the tool. Advantageously, as a rule, the "imposed stress" should be chosen so that the "machining stress" produces but a supplementary deformation smaller than the tolerance admitted for the machining of the piece.

Preferably, the imposed stress is made adjustable or controllable by the person making use of the machine.

Likewise, I provide measurement apparatus, advantageously of the pneumatic amplification type, capable of recording the elastic deformation of the elements subjected to the "imposed stress." Preferably, these measurement apparatus are disposed and checked so that they directly indicate the relative displacements of the piece and the tool under the effect of the elastic deformation of the elements subjected to the imposed stress.

It will be supposed, by way of example, that these features are applied to the case of a grinding machine.

Figure 1:
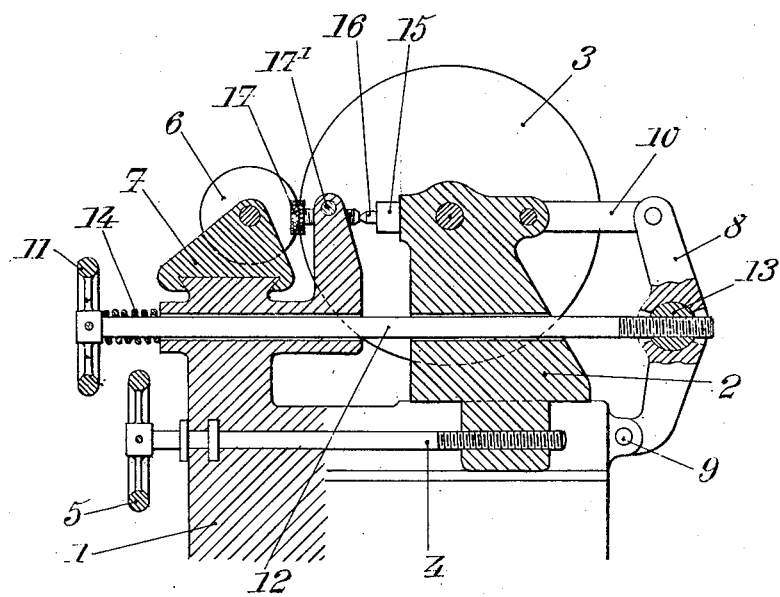
Fig. 1 is a diagrammatic vertical section of a machine-tool made according to an embodiment of the invention.

According to the embodiment illustrated by Fig. 1, this machine includes a frame 1 carrying a carriage 2 on which is mounted the grinding wheel, driven in any suitable manner. This carriage 2 can be displaced with respect to frame 1 through any suitable control device, such as a threaded rod 4 operated by means of a hand wheel 5 to be actuated by the operator of the machine.

In order to support the piece 6 to be machined, I provide a frame 7 movable parallelly to the axis of revolution of the grinding wheel.

Having thus provided the elements of an ordinary grinding machine, I add thereto means capable of exerting on carriage 2 a stress tending to move, for instance, grinding wheel 3 toward, or away from, piece 6.

For this purpose, for instance, I make use of the following elements:

I provide a lever 8 pivoted at its upper end, located at the same level as the point that is being machined, to one end of a connecting rod 10 extending in the horizontal direction, the other end of said rod being pivoted to carriage 2. As for the lower end of lever 8, it is pivoted at 9 to frame 1.

In order to make it possible to act upon this lever 8, I provide a hand wheel 11, fixed to a rod 12 screwed in a knuckle 13 fitted in an intermediate point of lever 8. A spring 14 is interposed between hand wheel 11 and frame 1.

Thus, by compressing spring 14, by screwing of rod 12, it is possible to produce the "imposed stress" and to adjust it.

In order to measure the deformations produced by this stress, I provide, for instance on carriage 2, a measurement apparatus 15 including a movable portion 16, elastically pushed or otherwise urged toward an adjustable stationary abutment 17 carried by frame 1. This abutment 17 is fixed in the desired position of adjustment by a screw 17¹ or the like. Preferably the displacement of the movable portion 16 of the measurement apparatus takes place in a horizontal plane passing through the machining point or points and the axis of the grinding wheel, and, in a vertical plane as close as possible to the machining point or points in question.

Thus, this measurement apparatus makes it possible to record the displacements of the grinding wheel with respect to the piece to be machined, and the working of the machine which has just been described will be as follows:

In the usual machines, the adjustment of the grinding wheel with respect to the piece is effected by displacing carriage 2 with respect to the frame 1 of the machine.

The measurement of this displacement can take place in various ways and as, as a rule, these displacements are very small, they are multiplied by having the readings made on a graduated scale carried by hand wheel 5. Now, there exists, inside carriage 2 for instance, deformations between the axis of the grinding wheel and the points of contact of carriage 2 on the frame 1 of the machine. These deformations produce a variation of the relative positions of the grinding wheel and the piece, which variations cannot be measured through the usual means since these deformations do not exert any reaction on the handwheel 5. These deformations may be constituted, for instance, by a bending resulting from the pressure exerted by the piece 6 that is being machined, on the grinding wheel 3.

On the other hand, the bending deformations of carriage 2 will be the more important as the pressure exerted by the grinding wheel on piece 6 are more important, and, as a matter of fact, it is wholly impossible to know what will be the exact dimension of piece 6 after a machining operation as long as the value of the deformation that takes place in carriage 2 is unknown.

In order to obviate this drawback, according to the present invention, the carriage 2 is subjected, before the machining operation, to a deformation such that the action or the reaction of piece 6 on grinding wheel 3 has no disturbing influence on this deformation. For this purpose, it suffices to exert on carriage 2 a stressing force of a value much higher than that of the action or the reaction of piece 6 on grinding wheel 3. This stress is produced by spring 14, the compression of which is adjustable through the intermediate of hand wheel 11. It is thus possible to make practically negligible the effect of the action or reaction of piece 6 on grinding wheel 3.

The displacements imparted to grinding wheel 3 by the stress that is imposed may be as high as some thousandths of millimeter, and they will be measured by means of apparatus 15.

It will be readily understood that the fact of providing a lever such as 11, fitted with a rod 12 screwed in a knuckle 13, makes it possible to displace carriage 2 over relatively considerable distances and subsequently to readjust, through a corresponding screwing or unscrewing, the tension of spring 14 in such manner as to reproduce the deformations in carriage 2. In correspondence with such an operation, it will be of course necessary to perform a new readjustment of the measurement apparatus, for instance by making use of the hand operable abutment 17 which makes it possible to take up relatively considerable length variations as may occur as a consequence of the displacement of carriage 2 on the frame of the machine.

Advantageously, the measurement apparatus will be graduated experimentally in any suitable manner in metric units for instance and it will thus make it possible directly to measure:

a. Either the displacement of the grinding wheel axis with respect to the axis of piece 6; or b. Preferably, in the case of a cylindrical piece for instance, having a rotation movement, the variation of dimension obtained on the piece, which variation is equal to twice the displacement of the tool with respect to the piece.

It is also possible to determine this graduation not only on the measurement apparatus, but also on the hand wheel 11, after a suitable determination of the strength of spring 14, thus enabling the operator, by a mere reading of a graduation of hand-wheel 11 moving along an index, to know the value of the displacement imparted to the axis of grinding wheel 5 by the deformation of carriage 2.

It is perfectly obvious that the measurement apparatus designated by reference numeral 15 might quite well be located at another place than that shown on Fig. 1. Furthermore, it would be possible, owing to a preliminary series of measurements, directly to measure the displacements of the axis of grinding wheel 3 even if the measurement apparatus 15 were not located in the plane passing through the axis of the grinding wheel and the point where the machining operation is being performed.

Now, if it is supposed that it is desired to apply the invention to a centerless grinding machine, it is for instance possible to proceed in the following manner:

The frame 18 of the machine (see Fig. 2) carries the working grinding wheel 19, while the driving wheel 20 is carried by a carriage 21 movable in the usual manner. For instance, as shown by the drawing, the displacements of carriage 21 are operated by means of a hand wheel 22 mounted on a threaded rod 23 fixed in the axial direction with respect to frame 18 and screwed in a portion of carriage 21. The piece 24 to be machined, in this construction, is placed between the grinding wheels 19 and 20.

The device for producing the imposed stress is made in the following manner:

I provide a threaded rod 25, actuated through a hand-wheel 26, screwed in a socket 27 capable of sliding in frame 18 and adapted to be fixed in the desired position by any suitable tightening means such as 28, this rod extending freely through the carriage 21.

I interpose a spring 29 between said carriage 21 and a shoulder provided on rod 25 between carriage 21 and frame 18, and another spring, designated by reference numeral 30, between carriage 21 and the hand-wheel 26, which is located, with respect to said carriage, on the opposite side from said shoulder.

With such an arrangement, it will be readily understood that the screwing or unscrewing of hand-wheel 26 causes one of the two springs 29 and 30 to be compressed and therefore frame 18 and carriage 21 to be bent in one direction or the other, thus causing the axes of the two grinding wheels to be moved toward, or away from, each other. By giving these bending deformations, before the working of the pieces, sufficiently considerable values, the action or reaction of piece 24 on grinding wheels 19 and 20 is practically without influence and therefore all the pieces, whatever be their dimensions before the machining operation, which are treated on the machine are given the same final dimensions.

In order to measure, as in the case of Fig. 1, the relative displacements (chiefly produced by bending deformations) between the axes of grinding wheels 19 and 20, I may provide a measurement apparatus 31 including a movable portion 32 constantly applied in an elastic manner on an abutment 33 screwed in frame 18 and fixed in position by a lock nut 33¹. The displacements of this movable part 32 advantageously take place in a plane passing through the axis of both of the grinding wheels 19 and 20 and in a vertical plane passing as near as possible to the points of contact between piece 24 and the two grinding wheels 19 and 20.

For this purpose, for instance, the measurement apparatus 31 is supported by two guides 34 and 35 fixed in carriage 21 and adapted to slide freely through frame 18.

It will be readily understood that the adjustable stop 33 makes it possible to take up the variations of distance of carriage 21 with respect to frame 18, which variations may be rather important, according to the dimension of the pieces to be machined. At the same time, socket 27 is released by control member 28, in such manner as to enable the whole system which produces the bending deformations to have relatively considerable displacements.

Fig. 3 shows how a pneumatic measurement device can be adapted for measuring the deformations above referred to. In this figure of the drawings, I have once more shown, by way of example, a grinding machine constituted by a frame 36, a grinding wheel holder 37, the grinding wheel 38 of which is driven through means which are not shown, said grinding wheel acting upon a piece 39 supported by a tool holder 40. The carriage 37 which holds the grinding wheel can be actuated by the operator by means of a hand-wheel 41 provided with the necessary speed reducing gears.

At the upper part of the grinding wheel holding carriage 37, there is fixed a threaded screw 42 which extends through the upper part 46 of the piece-holder 40. On the right hand side of the figure, the end of rod 42 is constituted by a threaded part around which is mounted a spring 44 the tension of which is adjusted by means of hand wheel 43.

In order to measure the displacements of grinding wheel 38 with respect to piece 39 due to the elastic deformations of carriage 37 and piece holder 40 under the action of rod 42 and spring 44, I provide a measurement apparatus made for instance as illustrated by Fig. 3.

This apparatus includes a device for feeding a chamber opening into the top end of a pipe 53 with gas at a fixed pressure, and means for producing, at the other end of said pipe 53, a leak into the atmosphere through a passage of a section proportional to the displacements to be measured. The pressure measured in said chamber thus gives the value of these displacements.

In the embodiment illustrated by the drawing, the gas feed device includes a vessel 54 containing a liquid up to a given level and open to the atmosphere at its top part. A tube connected at the top with a source of gas under pressure projects into said vessel so as to have its open bottom end immersed in the liquid. Thus, the excess of gas escapes, by bubbling through the liquid, into the atmosphere, while gas at a thoroughly constant pressure is fed from the top part of said tube through a calibrated orifice to the chamber above mentioned. This chamber is in communication with a pressure gauge 55 and opens into pipe 53.

On the other hand, a casing 47, fixed by a screw 48 to the grinding wheel holder 37 has its left hand end in free communication with the atmosphere and its right hand end connected to the lower end of pipe 53. Communication between these ends of casing 47 is controlled by a valve the stem 52 of which projects from casing 47 on the right hand side thereof so as to be in contact with a finger 49 carried by piece holder 40; the position of finger 49 on said piece holder 40 being adjustable by means of a screw having a milled head 50 and held in position by a lock nut 51.

Thus, when carriage 37 and piece holder 40 are elastically deformed as the result of a rotation of hand wheele 43, finger 49 pushes stem 52, which causes an opening of the valve carried by said stem and a drop of the pressure measured by gauge 55, and, in a general manner, all relative displacements of the respective axes of grinding wheel 38 and piece 39 are measured by displacements of the liquid level in pressure gauge 55.

It is therefore possible, by comparison with other measuring means, to graduate pressure gauge 55 directly in variations of the distance between the grinding wheel axis and the piece axis.

Figure 2:
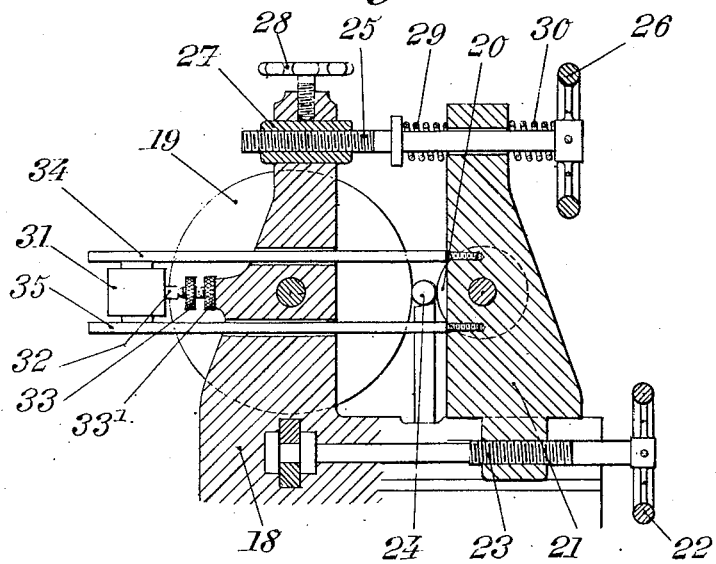
Fig. 2 is a view, similar to Fig. 1, corresponding to another embodiment.

This machine works in the same manner as those of Figs. 1 and 2. A suitable rotation of hand wheel 43 compresses spring 44 and permits of obtaining a sufficient deformation of carriage 37 and piece holder 40 for ensuring the feed of the grinding wheel.

Of course the invention is applicable to all machines in which elastic deformations influence the dimensions of the finished piece, and this independently of the nature of the tool that is used (grinding wheel, cutting tool, etc.).

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the appended claim.

What I claim is:

A machine tool for machining a piece which comprises, in combination, a frame, a tool, a piece holder carried by said frame, a tool holder slidable in said frame toward and away from said piece holder, means for sliding said tool holder in said frame to produce a feed of the tool, a lever pivoted at one end to said frame, a link interposed between the other end of said lever and said tool holder, a knuckle mounted at an intermediate point of said lever, a threaded rod extending freely through said frame and said tool holder and adjustably screwed at one end in said knuckle, means at the other end of said rod for screwing it, an abutment near said last mentioned rod end, a spring interposed between said abutment and said frame, and means for adjusting the action of said spring.

MARCEL MENNESSON.

REFERENCES CITED

The following references are of record in the file of this patent:

UNITED STATES PATENTS

| Number | Name | Date |
|---|---|---|
| 387,121 | Taylor | July 31, 1888 |
| 417,527 | Taylor | Dec. 17, 1889 |
| 432,144 | Muncaster | July 15, 1890 |
| 671,448 | Morton | Apr. 9, 1901 |
| 2,032,011 | Gould | Feb. 25, 1936 |
| 2,377,239 | Kasen | May 29, 1945 |